No. 835,886. PATENTED NOV. 13, 1906.
R. T. GUNN.
PROCESS OF MAKING POTABLE AND AËRATED WATER.
APPLICATION FILED JAN. 10, 1905.
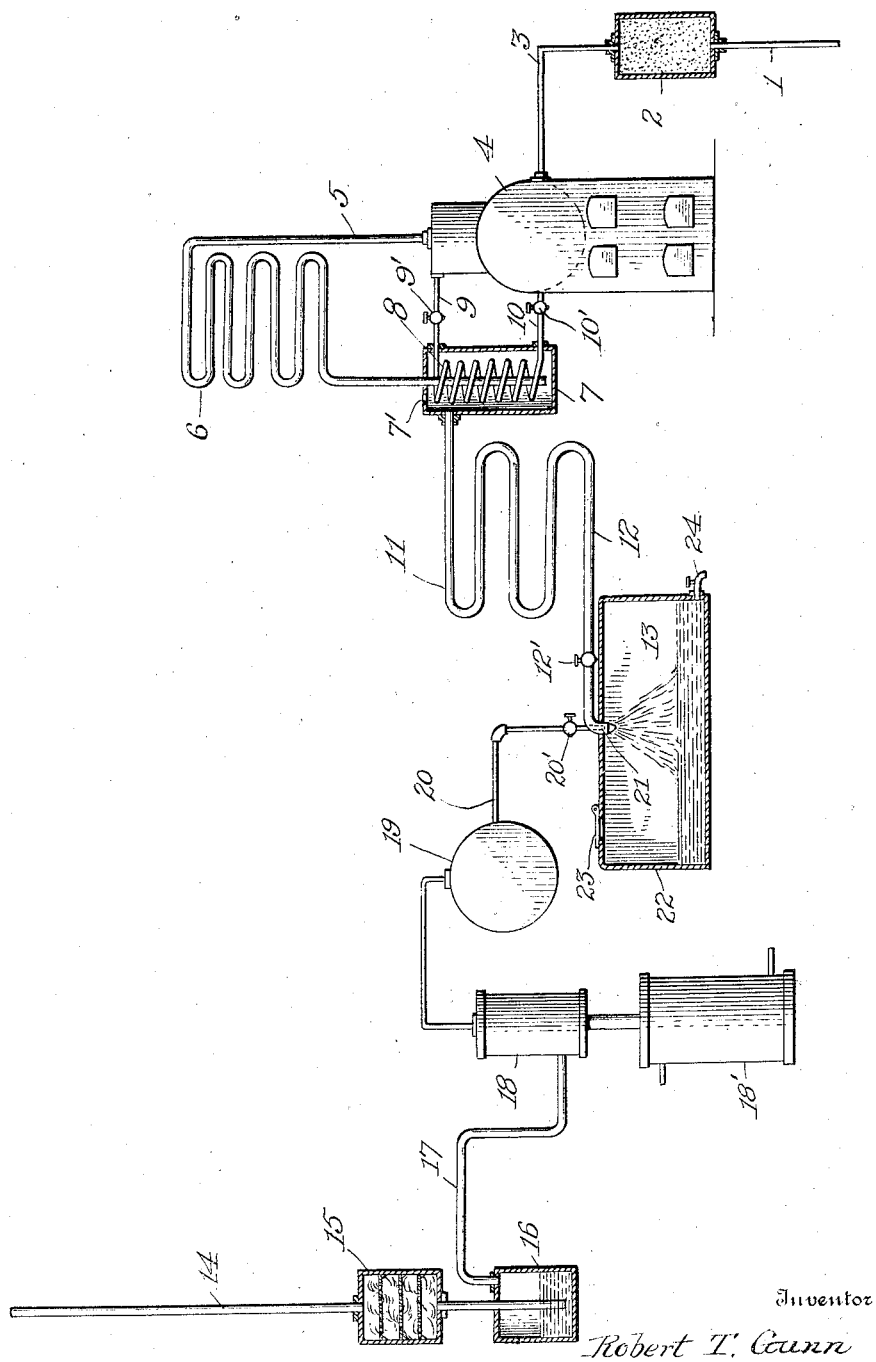

UNITED STATES PATENT OFFICE.

ROBERT T. GUNN, OF NORFOLK, VIRGINIA.

PROCESS OF MAKING POTABLE AND AERATED WATER.

No. 835,886. Specification of Letters Patent. Patented Nov. 13, 1906.

Application filed January 10, 1905. Serial No. 240,385.

*To all whom it may concern:*

Be it known that I, ROBERT T. GUNN, a citizen of the United States, residing at Norfolk, in the county of Norfolk and State of Virginia, have invented certain new and useful Improvements in Processes of Making Potable and Aerated Water, of which the following is a specification.

My invention relates to a process of purifying and aerating water on a commercial scale, whereby swamp-water or any other impure water may be rendered pure and palatable.

The object of my invention is to convert impure into pure water having the sweet taste of the best drinking-water by a thoroughly efficient, simple, and economical process.

A further object is to effectually sterilize the air used in the aeration of purified water.

In the practice of my process I first filter the water to be purified and then pass it to a boiler, where it is boiled, the steam or vapor being condensed and run into a suitable tank. The water may be then heated to the boiling-point, if found necessary, to remove any ammonia or other gas carried over through the condenser. The purified water is then conducted to a suitable receiving-tank. The water thus collected has had practically all of the air driven out of it, to which is attributed the "flat" taste noticeable in boiled water. To make such purified water palatable, it is therefore necessary to aerate it—that is, to charge it with small particles of air. To do this, the air is first passed through a suitable filter or filters, thereby removing many of the impurities held in suspension therein. It is then compressed to a degree sufficient to heat it to the point of sterilization, this being effected when the heat becomes so great as to kill the germs or bacteria, the compression also acting as a physical exterminator. The air so purified is then commingled with the purified water. This may be done in various ways; but I prefer to introduce the compressed air and the water into a spraying device on the order of an atomizer, the water thus taking up an abnormal amount of air, not only because of the fact that the water is in the form of a spray, but because of the reduction in the temperature of the water by the expansion of the air in contact therewith.

In the practice of my process in its broader aspects it is of course immaterial by what process or method the water is purified, whether by mechanical or chemical means. Hence I wish it to be understood that my invention is not limited to any particular method of purifying the water.

The above-described process may be carried out in various ways; but in the accompanying drawing I have illustrated a form of apparatus which I deem best for the purpose, which I will now describe.

Referring now to the drawing, the single figure of which is a diagrammatic view of the various elements of an apparatus designed to carry out my process, and in which like characters designate like parts wherever they occur, 1 designates a supply-pipe connected with the source of water-supply, which leads the water through a filter 2 of sand, coke, or the like, thence through a feed-water pipe 3 to a boiler 4. The water is then boiled and the steam or vapor ascends through the steam-pipe 5 and is condensed in the condenser 6, the water of condensation being collected in the tank 7, having an opening 7'. The open tank 7 is equipped with a coil 8 of steam-pipe leading off from the boiler 4, the steam from the boiler passing through the upper branch 9 of the pipe and back through the lower branch 10 thereof. The pipes 9 and 10 are provided with cocks 9' and 10', respectively, by which the steam may be regulated or cut off from the coil 8. By means of this coil 8 the water of condensation may be brought up to the boiling-point by the proper regulation of the valves 9' and 10' in order to drive off ammonia or other gases. Then the water is again cooled in the coils 11 and conveyed through pipe 12 to the receiving-tank 13. 12' is a regulating-valve in pipe 12 to control the water to the atomizer to be presently described.

14 designates an air-supply pipe, by which air is conveyed through a filter 15, preferably composed of layers of absorbent cotton laid on removable perforated trays, whereby the layers first becoming foul may be readily removed and clean ones substituted therefor. The air is next carried to the bottom of a tank 16, partially filled with water or other suitable purifying liquid, in which it is liberated and passed up through the same, thence through a connecting-pipe 17, leading to an air-compressor 18, which compressor is operated by any suitable motor 18'. By the passage of the air through water or other liquid in the tank 16 the particles of dust and gases which have been carried through the cotton filter 15 are taken out. After the air has been purified by its passage through the filters 15 and 16 it is passed through an air-compressor 18, by which it is driven into an air-receiver 19 at a sufficient pressure to thoroughly sterilize it, this being effected not only by the temperature of the air being raised high enough to kill the germs, but by the pressure itself, which acts as a physical exterminator. This sterilization of the air by heat and pressure I regard as new and of the essence of my invention.

From the air-receiver the air passes through a pipe 20 into the end of the pipe 12, where it enters the receiving-tank 13 simultaneously with the purified water. The pipe 20 is provided with a regulating-valve 20' to control the air-supply and pressure to the atomizer. The pipes 12 and 20 are preferably so relatively arranged as to be easily connected to any form of improved atomizer 21, the water thus entering the receiving-tank 22 in the form of a spray.

23 is a relief-valve at the top of the tank, and 24 is a cock for drawing off the pure aerated water.

It is known that when a gas expands heat is taken up; also, that cool water will take up more air than water at a higher temperature. Hence by bringing the water and air together in the manner above described I cool the water, thus enabling it to take up more air and at the same time put the air and water into such physical relation as to bring all particles into intimate contact, whereby the aeration is still further facilitated. The aeration may be still further facilitated by providing cooling-coils to cool the air and water just before they reach the atomizer.

I have herein shown and described one form of apparatus for carrying out my process; but it is obvious that the same may be carried out by many other forms of apparatus.

What I claim, and desire to secure by Letters Patent, is—

1. The process of aerating distilled water on a commercial scale consisting of subjecting air to a pressure sufficient to destroy the germs or bacteria therein and then expanding the air in the presence of the water in the form of a spray whereby the temperature of the water is reduced, the water and the air at the same time being brought into intimate contact with each other.

2. The process of purifying and aerating water consisting of boiling the water, condensing and collecting the vapor, reboiling the water of condensation and collecting the water in a suitable receiving-tank, subjecting a volume of air to a preliminary scrubbing and then to a pressure sufficient to destroy the germs or bacteria therein, and in then introducing the air into the receiving-tank simultaneously with the introduction of the water therein.

In testimony whereof I affix my signature in presence of two witnesses.

ROBERT T. GUNN.

Witnesses:
WILLIAM JOHNSTON LAWRENCE, Jr.,
JOHN M. BROCKENBROUGH.